United States Patent [19]

Nakagawa

[11] Patent Number: 5,060,473
[45] Date of Patent: Oct. 29, 1991

[54] SYSTEM FOR DETECTING DETERIORATION OF CATALYST IN CATALYTIC CONVERTER

[75] Inventor: Toyoaki Nakagawa, Kanagawa, Japan

[73] Assignee: Nissan Motor Company, Limited, Yokohama, Japan

[21] Appl. No.: 379,134

[22] Filed: Jul. 13, 1989

[30] Foreign Application Priority Data

Jul. 13, 1988 [JP] Japan .................. 63-175462
Aug. 8, 1988 [JP] Japan .................. 63-105137

[51] Int. Cl.$^5$ .................................... F01N 3/28
[52] U.S. Cl. ........................................ 60/277
[58] Field of Search .......................... 60/274, 277

[56] References Cited

U.S. PATENT DOCUMENTS

| | | | |
|---|---|---|---|
| 3,969,932 | 7/1976 | Rieger | 60/277 |
| 4,656,829 | 4/1987 | Creps | 60/277 |
| 4,729,220 | 3/1988 | Terasaka | 60/277 |

FOREIGN PATENT DOCUMENTS 236659 9/1987 European Pat. Off. ......... 60/277

*Primary Examiner*—Douglas Hart
*Attorney, Agent, or Firm*—Pennie & Edmonds

[57] ABSTRACT

A system for detecting deterioration of a catalyst monitors temperature of catalyst. The system sets a temperature criterion which represents possible lowest temperature when the catalyst is in a normal condition. Abnormality of the catalyst is detected by detecting the catalyst temperature lower than the temperature criterion.

17 Claims, 4 Drawing Sheets

SYSTEM FOR DETECTING DETERIORATION OF CATALYST IN CATALYTIC CONVERTER

BACKGROUND OF THE INVENTION

1. Field of the Invention

The present invention relates generally to a system for detecting deterioration of the catalyst in a catalytic converter. More specifically, the invention relates to a deterioration detecting system suitable for detecting a deteriorating condition of a catalyst in a catalytic converter of an automotive internal combustion engine.

2. Description of the Background Art

In the recent days, requirements for anti-pollution performance are becoming much more strict than the past days. For answering such very strict requirements for anti-pollution performance in an exhaust system of an automotive internal combustion engine, various approaches have been taken. One of the important strategies in answering these anti-pollution requirements is the providing of a catalytic converter in an exhaust system of the engine for removing pollutants, such as CO, NOx and so forth. In order to achieve high level anti-pollution requirements, it is essential that the catalyst in the catalytic converter operates effectively, otherwise high level anti-pollution cannot be achieved.

Japanese Patent First (unexamined) Publication (Tokkai) Showa 56-88919 discloses a system for detecting an exhaust gas temperature to alarm of excessively high exhaust gas temperature. The disclosed system has an exhaust gas temperature sensor disposed within the catalytic converter for monitoring the exhaust gas temperature in the converter. The system detects excessively high temperature of the exhaust gas to activate an exhaust gas temperature warning indicator.

As will be appreciated, the Showa 56-88919 system simply detects excessive exhaust gas temperature to alarm of high exhaust gas temperature, since high exhaust gas temperature leads to damaging of the catalyst in the catalytic converter.

However, the shown system does not monitor the condition of the catalyst itself. In such a system, although extraordinary exhaust gas temperature can be detected, it is not possible to discriminate whether the abnormal temperature is caused by deterioration of the catalyst or cause by other reasons.

The applications has become aware that when the catalyst acts ineffectively due to deterioration, the exhaust temperature becomes lower. Therefore, it was found that by detecting extraordinarily low exhaust temperature, the deterioration condition of the catalyst can be detected so as to alarm of ineffectiveness of the catalyst.

SUMMARY OF THE INVENTION

Therefore, it is an object of the present invention to provide a system for detecting deterioration of a catalyst.

In order to accomplish aforementioned and other objects, a system is shown for detecting deterioration of a catalyst, by monitoring the temperature of the catalyst. The system sets a temperature criterion which represents the lowest possible temperature of the catalyst in its normal condition. Abnormality of the catalyst is indicated by detecting the catalyst temperature lower than the temperature criterion.

According to one aspect of the invention, a system for detecting deterioration condition of a catalyst comprises:

first means for monitoring temperature of a catalyst to produce a catalyst temperature indicative signal;

second means for monitoring engine driving condition for producing an engine driving condition indicative signal;

third means for generating a reference value signal representative of a deteriorated catalyst temperature criterion on the basis of the engine driving condition indicative; and fourth means for comparing the catalyst temperature indicative signal value with the reference value to produce an alarm when the catalyst temperature indicative signal value is smaller than the reference value.

The first means is provided in the vicinity of the upstream side of the catalyst. The present invention deteriorated catalyst detecting system further comprises a fifth means for detecting a current engine driving range for detection satisfaction of a predetermined catalyst checking condition in order to enable the fourth means when that predetermined catalyst checking condition is satisfied.

The second means monitors the engine driving condition including an engine coolant temperature and the fifth means detects an engine coolant temperature for enabling the fourth means. Alternatively, the fifth means detects an engine driving condition satisfying a predetermined air/fuel ratio feedback control condition, for enabling the fourth means only when the air/fuel ration feedback control condition is satisfied. Further in the alternative, the fifth means detects a steady engine driving condition for enabling the fourth means when the steady engine driving condition is maintained for a period longer than a given period. The fifth means may also detect the current engine driving range and enables the fourth means when the current engine driving range is within a predetermined engine driving range.

The first sensor may be provided a position where the catalyst temperature becomes maximum when the catalyst is in normal state.

According to another aspect of the invention, a system for detecting deterioration condition of a catalyst comprises:

first means, oriented at a first position in the vicinity of an inlet side of a catalyst for monitoring temperature of a catalyst to produce a first catalyst temperature indicative signal;

second means, oriented at a second position in the vicinity of an inlet side of a second catalyst for monitoring temperature of a catalyst to produce a second catalyst temperature indicative signal;

third means for monitoring engine driving condition for producing an engine driving condition indicative signal;

fourth means for generating a reference value signal representative of a deteriorated catalyst temperature criterion on the basis of the engine driving condition indicative; and fifth means for deriving a difference of the first and second catalyst temperature indicative signals and comparing the derived difference with a predetermined criterion for alarming deterioration condition of the catalyst when the difference is smaller than the predetermined criterion.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
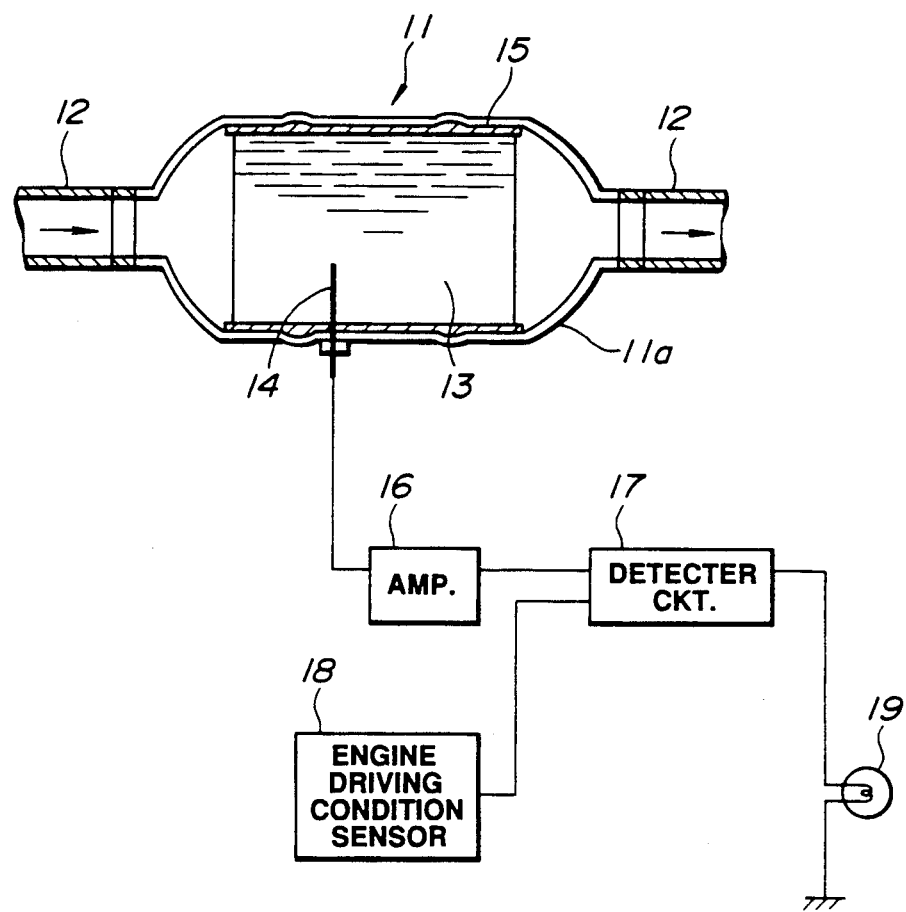
FIG. 1 is a block diagram of the preferred embodiment of a catalyst deterioration detecting system according to the present invention.

Referring now to the drawings, FIG. 1 shows a catalytic converter 11 employed in an exhaust system of an automotive internal combustion engine. The catalytic converter 11 is disposed in an exhaust pipe 12 defining an exhaust passage through which an exhaust gas flows. A catalyst 13 is disposed in the catalytic converter 11. Also, a temperature sensor 14 which serves as a catalyst temperature sensor, is disposed in the catalyst for monitoring the temperature within the catalyst.

In the shown embodiment, the catalyst comprises a monolithic catalyst. As is well known, the monolithic catalyst can be generally classified into a honeycomb type catalyst and a stainless wool type catalyst. In the shown embodiment, the catalyst comprises a honeycomb type catalyst having alumina honeycomb as a catalyst carrier, carrying catalyst on an oxidation layer of thin alumina foil of the catalyst carrier. The catalyst 13 is surrounded by an insulator 15.

The temperature sensor 14 comprises a thermocouple, such as a Chromel-Alumel thermometer. The temperature sensor 14 is mounted and supported on the outer casing 11a of the catalytic converter 11 and positioned to monitor the exhaust gas temperature at the center of the exhaust gas flow and upstream of the catalyst 13. The temperature sensor 14 thus monitors the exhaust gas temperature immediately upstream of the catalyst to produce a catalyst temperature indicative signal. The temperature sensor 14 is connected to a detector circuit 17 via an amplifier 16. The detector circuit 17 is also connected to a sensor means 18 which monitors an engine driving condition. The sensor means 18 is generally referred to as an "engine driving condition sensor" and may comprise a plurality of sensors for monitoring an engine revolution speed, an engine coolant temperature, an air/fuel ratio and so forth. The detector circuit 17 may comprise a microprocessor having a memory unit for storing the program to be executed and for temporarily storing the catalyst temperature indicative signal value and the engine driving condition indicative signal values. The detector circuit 17 processes the input signals in the manner discussed later to produce an alarm signal. The detector circuit 17 outputs the alarm signal to a deteriorated catalyst indicative alarm indicator 19.

Figure 2:
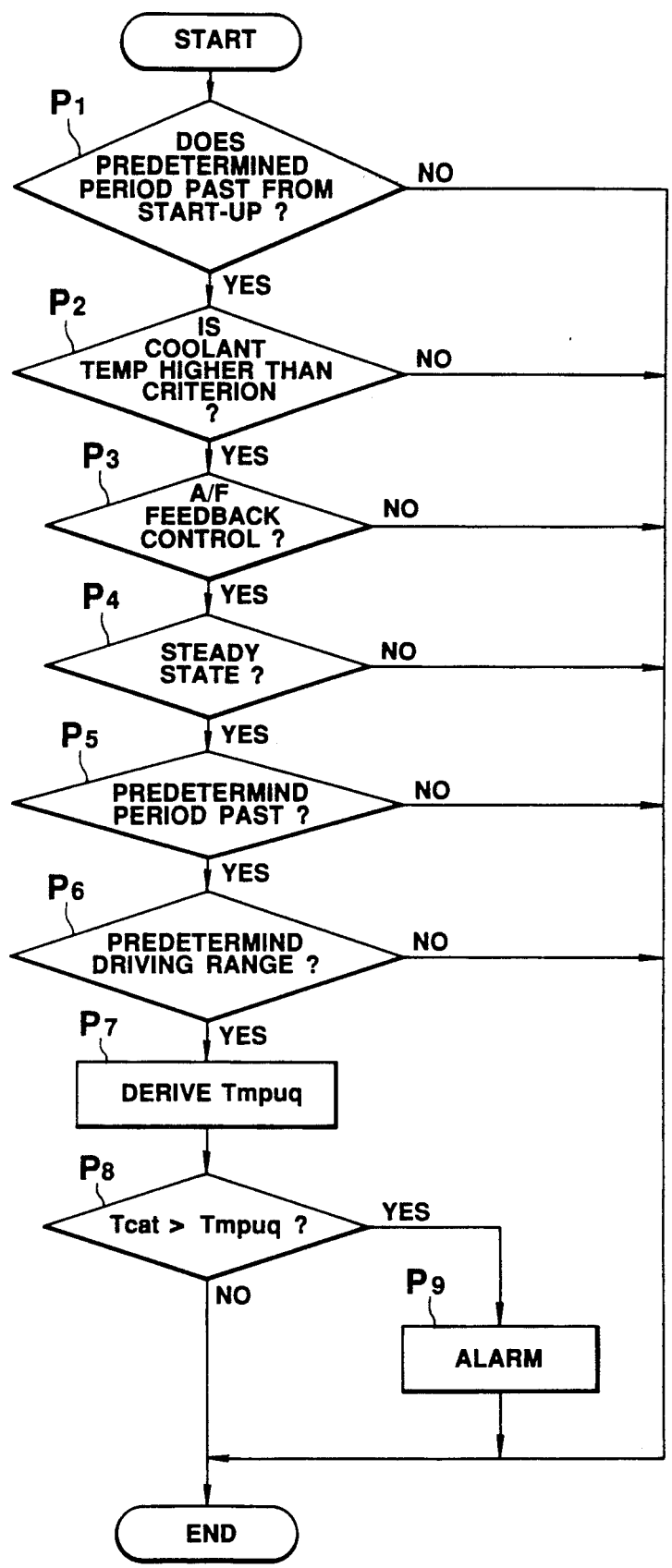
FIG. 2 is a flowchart of a routine to be executed in the catalyst deterioration detecting system for detecting deterioration condition of the catalyst.

FIG. 2 shows a flowchart of a routine for detecting deterioration condition of a catalyst. The shown routine may be triggered cyclically or periodically as governed by a main program executed as a background job.

Immediately after starting execution, an elapsed time from starting-up of the engine is checked at a step P1. Step P1 is performed to determine whether the elapsed time is longer than a predetermined period. In order to enable this, the detector circuit may have an internal clock counter for measuring an elapsed time from turning ON of an ignition switch. Therefore, in the practical operation, the value of clock counter is read out and compared with a reference timer value representative of the predetermined period. This is required since the engine is unstable during initial starting up period and thus accurate judgement of whether the catalyst is a deterioration condition or not cannot be made.

When the elapsed time as checked at the step P1 is longer than or equal to the predetermined period, then, an engine coolant temperature indicative data in the engine driving condition indicative signal is read out and checked to determine if the engine coolant temperature is in a normal temperature range. Practically, the check is performed by comparing the engine coolant temperature indicative signal value with upper and lower engine coolant temperature threshold at a step P2. The normal engine coolant temperature range may be set in a range where the engine is not in cold engine condition and not in overheating condition, for example the engine coolant temperature range is set in a range of 80° C. to 100° C. When the engine coolant temperature is within the normal engine temperature range and thus the answer at the step P2 is positive, check is performed to determine if the engine control is in an air/fuel ratio feedback control state, at a step P3. As is well known, while the air/fuel ratio feedback control is performed, fuel supply amount versus intake air flow rate is controlled so as to maintain the air/fuel ratio in the vicinity of stoichiometric value and relatively stable.

When the engine control is in a air/fuel ratio feedback control state and thus the answer at the step P3 is positive, check is performed to determine if the engine driving condition is in a steady state or not, at a step P4. The engine condition is determined by checking engine speed, engine load and so forth. When the engine driving parameters are not significantly changed, judgement can be made that the engine is driven at staedy state.

If the answer of any of the steps $P_1$ through $P_4$ is negative, the process directly goes to END and return to the background job.

Figure 3:
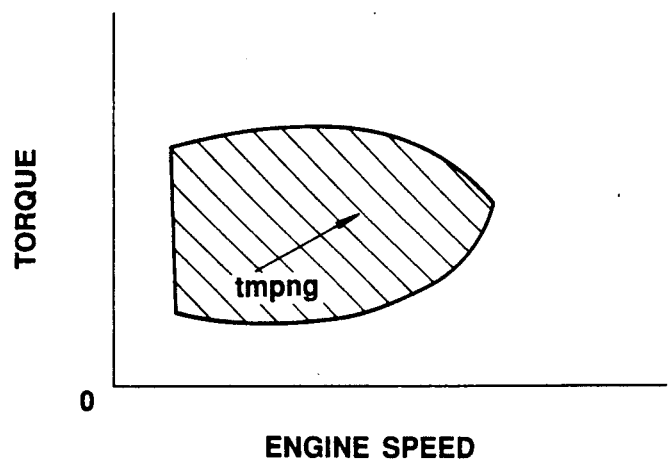
FIG. 3 is a chart showing an engine driving range in which checking of catalyst is performed.

When the engine driving condition is steady state and thus the answer at the step is positive, an elapsed time from the time at which the steady engine state is at first detected is checked at a step P5. For checking the elapsed time, the internally installed clock counter as set forth may be used. If the steady state is maintained for a longer period than a predetermined steady engine speed criterion and thus the elapsed time indicative counter value as checked at the step P5 is greater than a predetermined reference time value representative of the steady engine speed criterion, then the engine driving range is checked to determine if the current engine driving range is within a predetermined range for checking the state of the catalyst, at a step P6. In the shown embodiment, the predetermined engine driving range is set in terms of the engine output torque and the engine speed, as shown in FIG. 3. Data defining the predetermined engine driving range is stored in the memory of the detector circuit 17 in a form of map data. Therefore, the current engine driving range is compared with the predetermined engine driving range in terms of the engine output torque and the engine speed against the map data.

When the elapsed checked at step P5 is shorter than the predetermined reference time, or when the current engine driving range is out of the predetermined engine driving range, the process goes to END.

On the other hand, when the current engine driving range as checked at the step P6 is within the predetermined range, a catalyst temperature criterion Tmpng, defining the lowest normal catalyst temperature, is determined on the basis of the engine output torque and the engine speed.

Figure 4:
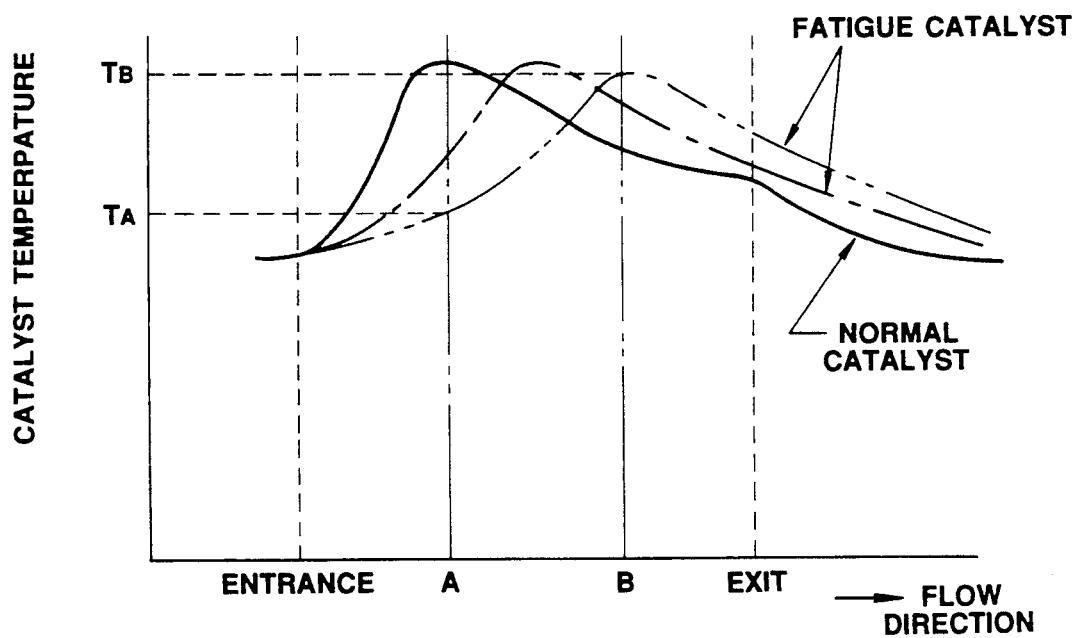
FIG. 4 is a graph showing temperature variation of an exhaust gas at the catalyst.
Figure 5:
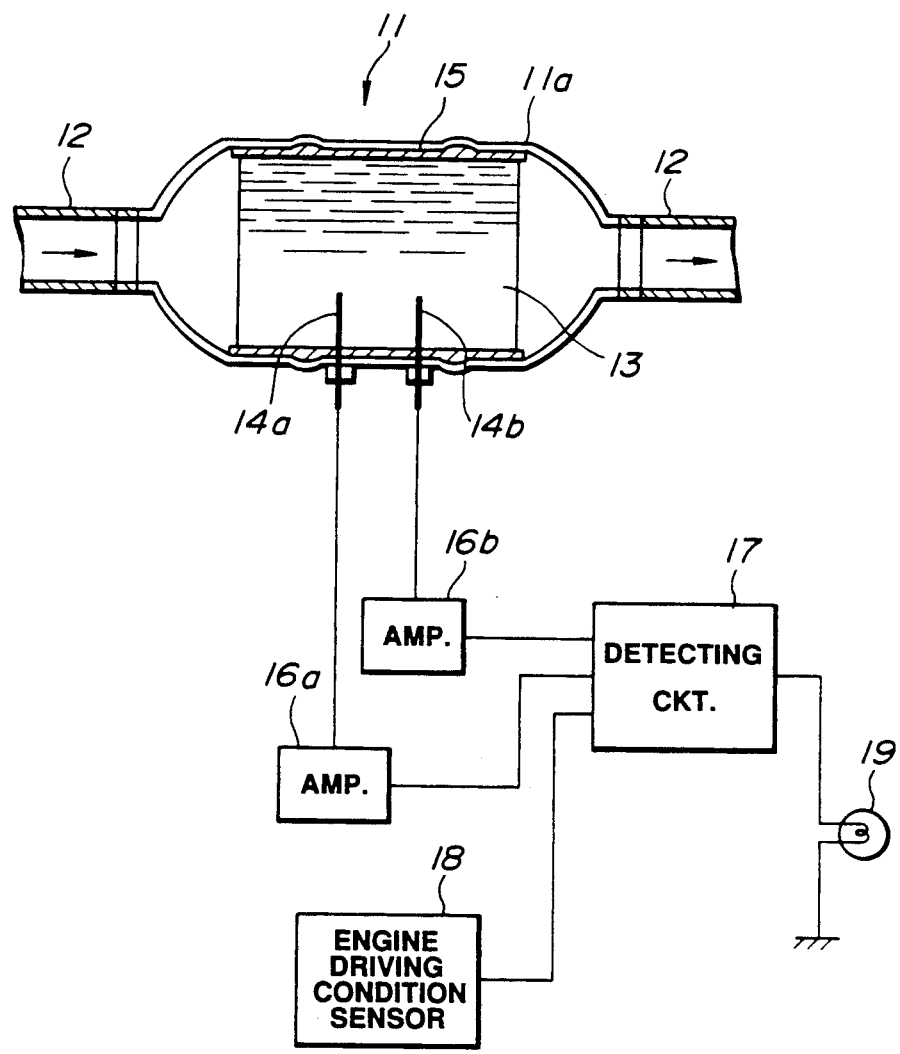
FIG. 5 is a block diagram of a modification of the catalyst deterioration detecting system according to the invention.

The relationship between the condition of the catalyst and the catalyst temperature is illustrated in FIG. 4, in which temperature distribution in the catalytic converter is shown. If the catalyst is in a normal state, and thus acts on the exhaust gas effectively, the pollutant absorbing reaction is completed at the entrance of the catalyst, peak of the catalyst temperature appears in the vicinity of the entrance at a point A. On the other hand, if the catalyst is in a deterioration state, the pollutant absorbing reaction at the entrance of the catalyst becomes incomplete, thereby causing the catalyst temperature to peak at a location offset toward a point B. Therefore, when the catalyst is in a deteriorated condition, the temperature of the catalyst at the point A becomes lower than that can be while the catalyst is in normal state. Therefore, by monitoring the catalyst temperature at a point A, catalyst condition can be detected.

In the shown embodiment, the catalyst temperatures while in the deteriorated state of the catalyst under various engine driving conditions is experimentarily obtained and set in the form of a table map in the memory of the detector circuit 17 as the catalyst temperature criterion Tmpng table. Though the catalyst temperature criterion Tmpng is set in terms of the engine output torque and the engine speed in the shown embodiment, various engine driving parameters can be used to determine the catalyst temperature criterion.

After determining the catalyst temperature criterion Tmpng, the current catalyst temperature indicative value Tcat derived from the actually measured catalyst temperature by the temperature sensor 14 is compared at a step P8. If the catalyst temperature indicative value Tcat is higher than the catalyst temperature criterion Tmpng, judgement can be made that the catalyst is in a normal state. Therefore, the process goes END. On the other hand, if the catalyst temperature indicative value Tcat is lower than or equal to the catalyst tempreature criterion Tmpug, judgement can be made that the catalyst a deterioration state. Then, process goes to a step P9 to output an alarm signal for turning ON the deteriorated catalyst indicator 19.

Therefore, the driver can be visually alerted to a deterioration or abnormal condition of the catalyst. This enables the driver to repair or replace the catalyst for achieving desired efficiency of anti-pollution.

FIG. 6 shows a modification of the preferred embodiment of the deteriorated catalyst detecting system according to the present invention. In this embodiment, a pair of temperature sensors 14a and 14b are provided for monitoring catalyst temperature at axially different positions in the catalytic converter 11. The temperature sensor 14a is provided in the vicinity of the inlet side of the catalyst 13. The other temperature sensor 14b is provided in the vicinity of the outlet side of the catalyst. The positions of the temperature sensors 14a and 14b are respectively corresponding to the points A and B in FIG. 4. These temperature sensors 14a and 14b are connected to the detector circuit 17 via amplifiers 16a and 16b.

Since the catalyst temperature is variable depending upon the exhaust gas temperature at the inlet of the catalytic converter 11, the result of detection of the catalyst by utilizing the catalyst sometimes fluctuate depending upon the exhaust gas temperature. In order to avoid this, the shown modification employs a pair of catalyst temperature sensors for monitoring the catalyst temperatures at axially different locations. In the practical judgement of the catalyst condition, a difference of the catalyst temperatures monitored by two sensors is derived. Based on the derived difference, judgement can be made whether the catalyst is in a normal condition or not. By this, influence of the exhaust gas temperature can be successfully eliminated.

It should be appreciated that judgement of the catalyst condition is made by comparing the derived difference with an experimentarily derived criterion representative of the criterion of deteriorated catalyst.

While the present invention has been disclosed in terms of the preferred embodiment in order to facilitate better understanding of the invention, it should be appreciated that the invention can be embodied in various ways without departing from the principle of the present invention. Therefore, the invention should be understood to include all possible embodiments and modifications to the shown embodiments which can be embodied without departing from the principles of the invention set out in the attached claims.

What is claimed is:

1. A system for detecting a deterioration condition of a catalyst comprising:
   a first means for monitoring temperature of a catalyst to produce a catalyst temperature indicative signal;
   a second means for monitoring engine driving condition for producing an engine driving condition indicative signal;
   a third means for generating a reference value signal, said reference signal value representative of a temperature criterion for determination of a deteriorated catalyst, and said reference signal value being generated on the basis of said engine driving condition indicative signal value; and
   a fourth means for comparing said catalyst temperature indicative signal value with said reference value to produce an alarm when said catalyst temperature indicative signal value is smaller than said reference value.

2. A system as set forth in claim 1, wherein said first means monitors a temperature in the vicinity of the upstream side of said catalyst.

3. A system for detecting deterioration condition of catalyst comprising:
   a first means for monitoring a temperature of a catalyst to produce a catalyst temperature indicative signal;
   a second means for monitoring engine driving condition and producing a corresponding engine driving condition indicative signal;

a third means for generating, on the basis of said engine driving condition indicative signal, a reference value signal representative of a temperature criterion for determining a condition of deterioration of said catalyst;

a fourth means for comparing said catalyst temperature indicative signal value with said reference value to produce an alarm when said catalyst temperature indicative signal value is smaller than said reference value; and a fifth means for detecting a current engine driving range and enabling said fourth means when said detected current engine driving range satisfies a predetermined catalyst check condition.

4. A system as set forth in claim 3, wherein said second means monitors an engine coolant temperature and said fifth means enables said fourth means in accordance with said monitored temperature.

5. A system as set forth in claim 3, wherein said fifth means detects an engine driving condition satisfying a predetermined air/fuel ratio feedback control condition, for enabling said fourth means when said air/fuel ratio feedback control condition is satisfied.

6. A deteriorated catalyst detecting system as set forth in claim 3, wherein said fifth means detects a steady engine driving condition for enabling said fourth means when the steady engine driving condition is maintained for a period longer than a given period.

7. A deteriorated catalyst detecting system as set forth in claim 2, wherein said fifth means detects the current engine driving range and enables said fourth means when said current engine driving range is within a predetermined engine driving range.

8. A system as set forth in claim 1, wherein said first sensor monitors a temperature at a position in the vicinity of where the catalyst temperature becomes maximum when said catalyst is in a normal state.

9. A system for detecting a deterioration condition of a catalyst comprising:

a first means for monitoring a temperature in the vicinity of an inlet side of a catalyst to produce a first catalyst temperature indicative signal;

a second means for monitoring a temperature of said catalyst downstream of said first means monitoring location, with respect to flow of the exhaust gas, to produce a second catalyst temperature indicative signal;

a third means for monitoring engine driving condition and producing a corresponding engine driving condition indicative signal;

a fourth means for generating a reference value signal representative of a deteriorated catalyst temperature criterion on the basis of said engine driving condition indicative signal value; and a fifth means for deriving a difference of said first and second catalyst temperature indicative signals and comparing the derived difference with the reference value indicated by said reference value signal.

10. A system as set forth in claim 9, wherein said first means monitors a temperature in the vicinity of the upstream side of said catalyst.

11. A system as set forth in claim 9, which further comprises a sixth means for detecting a current engine driving range and determining if said detected range satisfactorily corresponds to a predetermined catalyst checking condition and enables said fifth means when said predetermined catalyst checking condition is satisfied.

12. A deteriorated catalyst detecting system as set forth in claim 11, wherein said third means monitors the engine driving condition including an engine coolant temperature and said sixth means detects an engine coolant temperature for enabling said fifth means.

13. A system as set forth in claim 11, wherein said sixth means detects an engine driving condition satisfying a predetermined air/fuel ratio feedback control condition, for enabling said fifth means when said air/fuel ratio feedback control condition is satisfied.

14. A deteriorated catalyst detecting system as set forth in claim 11, wherein said sixth means detects a steady engine driving condition for enabling said fifth means when the steady engine driving condition is maintained for a period longer than a given period.

15. A deteriorated catalyst detecting system as set forth in claim 11, wherein said sixth means detects the current engine driving range and enables said fifth means when said current engine driving range is within a predetermined engine driving range.

16. A system as set forth in claim 9, wherein said first means monitors a temperature at a position in the vicinity of where the catalyst temperature becomes maximum when said catalyst is in a normal state.

17. A system as set forth in claim 3, wherein said first sensor monitors a temperature at a position in the vicinity of where the catalyst temperature becomes maximum when said catalyst is in a normal state.

* * * * *